March 30, 1965 P. D. RIGTERINK 3,175,535
DRAINAGE SYSTEM FOR A HOG HOUSE
Filed Nov. 15, 1962 2 Sheets-Sheet 1

INVENTOR.
PRESTON D. RIGTERINK
BY
ATTORNEYS

March 30, 1965      P. D. RIGTERINK      3,175,535
DRAINAGE SYSTEM FOR A HOG HOUSE
Filed Nov. 15, 1962      2 Sheets-Sheet 2
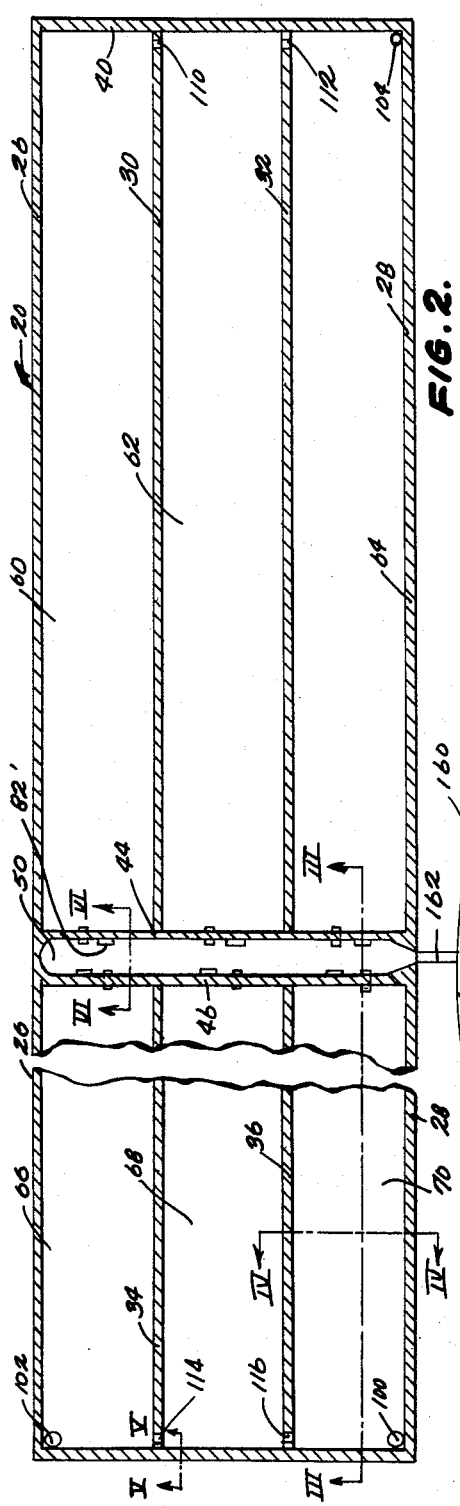
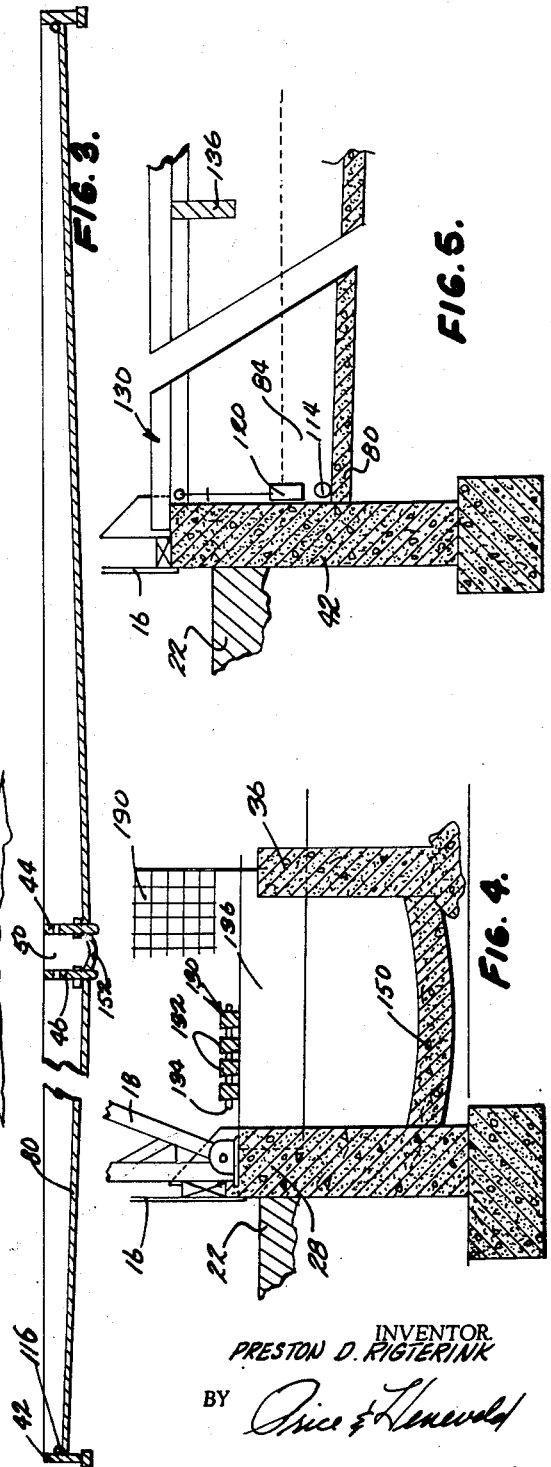
INVENTOR.
PRESTON D. RIGTERINK
BY
ATTORNEYS

United States Patent Office 3,175,535
Patented Mar. 30, 1965

3,175,535
DRAINAGE SYSTEM FOR A HOG HOUSE
Preston D. Rigterink, Zeeland, Mich., assignor to Automatic Poultry Feeder Company, Zeeland, Mich., a corporation of Michigan
Filed Nov. 15, 1962, Ser. No. 237,921
6 Claims. (Cl. 119—28)

This invention relates to an animal house, and more particularly to an animal house having a unique manure catching, water pit disposal system and construction providing optimum draining and flushing conditions of the pits, and also relates to such a system combined with a roof gutter drainage system.

Extensive experiments have been conducted heretofore by the inventor and his associates regarding a novel system of raising animals, such as hogs, in a house built over a water retention pit. The animals live on a wooden slatted floor above the water level in the pit, and trample the manure through the floor into the water where it forms a slurry, which is periodically drained. The novel house and system disclosed and claimed in U.S. Patent No. 3,137,270, issued June 16, 1964 entitled Animal Building Cleaning System and assigned to the assignee herein, showed such improved sanitation and economy that it was subsequently adopted commercially. When the system was applied to medium and large animal houses, however, it was found that the water-manure slurry did not always drain properly from the large sloped pits since a fan-shaped geometry of suspension particles settled out from the draining slurry onto the bottom of the pit in a direction towards the drain outlet. Further, without elaborate water jetting equipment or much labor, it was found to be extremely difficult to wash the particles off the pit floor after the slurry had drained out. Each subsequent drainage moreover created an increasing accumulation since the new particles cling to the old particles.

It is therefore the principal object of this invention to provide an animal house construction capable of handling a large number of animals on a slatted floor and having a water pit manure disposal system which allows complete and proper drainage of the water-manure slurry from the pit means, irrespective of the amount of floor area or the amount of manure.

It is another object of this invention to provide a water-pit animal house where the velocity of drainage slurry flow from the pit means is substantially the same over the pit bottom area, and is relatively large to cause the slurry particles to be carried out the drain.

It is another object of this invention to provide a water pit animal house where the pit means is formed of adjacent independent elongated sections or pits that not only create optimum flow of slurry, but also effect a flushing action therebetween for each drained pit utilizing wash from the adjacent pit.

It is still another object of this invention to achieve the above objects using rain water or roof cooling water to supplement the water supply to the pits.

These and other objects of this invention will be apparent upon studying the following specification in connection with the drawings in which:

FIG. 2 is a sectional enlarged plan view of the novel pit means under the house showing the plurality of adjacent, long, narrow pits, and the central gutter means;

FIG. 3 is a sectional enlarged view taken on plane III—III of FIG. 2 showing the pit means in elevation;

FIG. 4 is a sectional enlarged view taken on plane IV—IV of FIG. 2, and showing the slatted floor means above the water pits;

FIG. 5 is a sectional view taken on plane V—V of FIG. 2 and showing the slatted floor and foundation structure.

Figure 1:
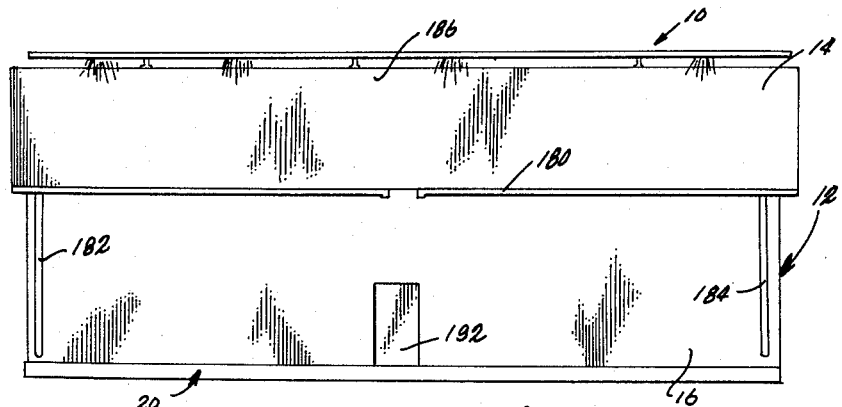
FIG. 1 is a side elevational view of the novel animal house, and showing a roof cooling spray means and roof gutter means having downspouts supplying water to the pit means under the house.
Figure 6:
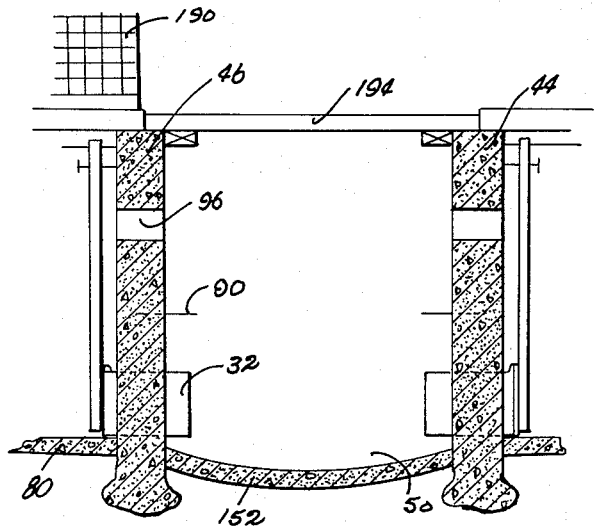
FIG. 6 is a sectional enlarged view taken on plane VI—VI of the central gutter means serving the plurality of elongated water pits.

Basically, the inventive animal house comprises a foundation and superstructure having a floor grate, preferably slatted, supported on the foundation above a water-filled pit means. The pit means comprises a plurality of adjacent elongated pits slanted toward one end and having a length many times greater than the width to cause relatively rapid slurry flow over the width of the pit during drainage thereof. A central, transverse gutter is common to the pits and adapted to receive slurry from the pits through a plurality of drain valves. At least one of the pits has a water inlet means at the opposite end from the gutter, and the adjacent pits have water flow gates therebetween to provide flushing of each drained pit by flow from the adjacent draining one, and to also provide water equalization during non-drain and fill periods. Preferably the water inlet means is connected to the roof gutter system to utilize rain or cooling water off the roof of the house to supplement the regular water supply to the water pits.

Referring specifically to the drawings, the animal house 10 comprises a superstructure 12 including a roof 14, and end and side walls 16 mounted to structural frame units 18 (FIG. 4) which may be the type illustrated and claimed in patent application Serial No. 56,542, filed September 16, 1960 entitled Building Frame Structure. Any other conventional superstructure components may be utilized. The animal house is supported on a foundation of reinforced concrete embedded beneath the earth 22 to a desired depth. The foundation includes elongated outside walls 26 and 28, inside support and pit-divider walls 30, 32, 34 and 36, outside end walls 40 and 42, and inside, central, transverse walls 44 and 46 which form the inner ends of the plurality of elongated water pits, and also form the elongated side walls of the transverse central gutter 50.

Each of the water pits 60, 62, 64, 66, 68 and 70 has an elongated configuration with a length several times greater than the relatively narrow width thereof. The concrete bottom 80 (FIG. 5) of each pit is sloped or slanted downwardly from the outer ends towards the central gutter, and has a drain valve 82 adjacent the gutter. The valves are normally closed to retain water 84 in the pits, but may be opened as by lifting actuator rod 88 to allow selective drainage of one or more pits through their individual outlets 33. Positioned opposite each of the drain valves and embedded in the opposite wall of gutter means 50 is a metal deflector that limits splashing of the water-manure slurry as it is drained. The water level in each pit is controlled by the height of an overflow outlet 96 in walls 46 and 44 for each pit.

Fresh water inlet means for water not containing manure in slurry or dissolved form is provided in one or more of the adjacent parallel pits at the end opposite the gutter. Thus, in the left end of the building as viewed in FIG. 2, water inlet means 100 is provided in the outer end of pit 70 opposite from the outlet valve. Also an inlet means 102 is provided in pit 66 on this opposite end.

Alternatively, as illustrated in the right-hand end of the building (FIG. 2) only one fresh water inlet 104 need be provided for each series of adjacent parallel pits. In walls 30, 32, 34 and 36 in the opposite ends thereof from the central gutter are gate means or openings between two adjacent pits. Thus, for example, opening 110 is provided in wall 30 between pits 60 and 62, and opening 112 is provided between pits 62 and 64. Likewise on the opposite end of the housing, openings 114 and 116 are provided. These may have suitable flow-control gate means 120 (FIG. 5) which can be lowered to cover the hole, or raised to uncover it to allow water flow therethrough.

When filling the pits from the fresh water inlets, these openings allow flow and act as water levelers between the pits. They also perform this function at other normal times, for example, if the pits receive water from the roof gutters. During drainage periods, these openings and gate means provide flushing outlets from a draining pit to an adjacent drained pit by allowing partial drainage of the former through the drained pit to flush the latter. This will be explained more fully hereinafter.

Supported on foundation 20 is a slatted floor construction 130, which includes a plurality of wooden slats 132 connected by long pegs 134. The slats are here shown to extend lengthwise of the housing, i.e. longitudinally thereof. A plurality of floor stringers 136 extend transversely of the longitudinal house and are spaced a few feet apart with their ends mounted in the outer foundation walls and their central portions resting on the inner walls. These help support the slatted floor. Thus, when the floor is referred to hereinafter as supported on the foundation, such support is intended to include any supplemental support such as stringers which become necessary depending upon the dimensions and configuration of the animal house. Also, it should be realized that the floor grate may be of parallel slats as shown, or of crossed slats, as is desired, providing the perforations are of sufficient size and number to allow the manure to be readily trampled through, and providing the slats are of sufficient size and construction to provide proper strength.

The long narrow floor 150 of each pit may be slightly concave for optimum flow conditions. Also, the floor 152 of the central gutter may be slightly concave. The gutter 50 communicates with a reservoir such as an open lagoon 160 or a closed vessel through a drain pipe 162 sloped downwardly from the gutter. The gutter is also sloped downwardly from the end opposite the drain pipe 162 to the drain pipe.

Water for the fresh water inlets 100, 102 and 104 may be obtained from any suitable source. Preferably, the main source is supplemented by water from off the roof 14 of the house 10. More specifically, the rain gutter system 180 includes downspouts 182 and 184 extending to the opposite ends of the building to supply water to the respective inlets on the opposite ends. Thus, rain water running off the building will supply some of the large volume of pit water needed. In southern sections of the country where the houses are cooled by purposely pumping cooling water through a conduit 186 to spray it along the top of the roof, the water serves a dual purpose, first to cool, then to fill the pits.

During use, before the animals are housed, drain valves 82 to the gutter are closed and water is introduced into the respective pits through the one or more water inlet sources 100, 102 and 104 at the ends of the house. The water is normally filled from a depth of almost one foot at the shallow end of the pits to about two feet at the deeper central ends of the pits. All of the pits are filled to the level determined by the lower edge of the respective overflow outlets 96 in walls 44 and 46, by flow through the equalizer holes or ports 114, 116, 110 and 112. When the pits are full of water, animals such as hogs are placed in the house and retained on the slatted floor 130 in a respective area thereof by suitable fencing 190. Thus, for example, the floor above each pit may be divided into several penned areas, with suitable gates in between for transfer of animals.

The animals can be supplied automatically with food and water from an external supply as described in patent application Serial No. 162,808 identified above. Thus, they need never leave the building.

A suitable entrance is provided to the building as for example through the central door 192 leading onto the pit cover or platform walkway 194 over the central gutter.

When, after a period of time, the water in the pits has received an amount of manure trampled through the slatted floor by the animals to provide a slurry of partly dissolved and partly suspended manure of a predetermined density, the pits are individually drained. This is achieved by first closing all gate means 120, and then opening the outlet valve 82 on one of the outside pits. The water flows at a relatively uniform and rapid velocity through the narrow pit to drag the slurry particles out through the drain and leave relatively little sediment on the bottom 80 of the sloped pit. The narrow elongated configuration of the pit provides optimum flow and drainage conditions. In order to remove the last vestiges of sediment on the floor of the pit, a gate means 120 for an opening between that pit and the adjacent one is opened, at least for a short period. Thus, for example, if pit 60 is drained first by allowing the slurry to flow out valve 82', down gutter 50, out drain 162, to reservoir 160, then gate means 120 over the port 110 is opened to drain at least part of the liquid from pit 62 through pit 60 to wash or flush the remaining sediment from the bottom surface of pit 60. Then this gate means may be closed, and pit 62 drained through its outlet valve into the central gutter. Pit 62 is then flushed through opening 112, at least for a short period. After pit 64 is drained, water from inlet 104 is used to flush it. The pits on the opposite end are drained and flushed in the same manner. It will be obvious that any number of adjacent pits may be utilized in this mutual flushing arrangement. Also, it will be obvious that instead of the gutter being at the center, it may be at the end of the house. The elongated configuration of the house in the example shown can be square or elongated in the opposite direction as long as the pits have their elongated configuration with a length several times that of the width to provide proper drainage flow conditions.

Various other obvious structural modifications may occur to those in the art upon studying the foregoing form of the invention, to suit a particular purpose, type of animal, section of the country, or structural material. These obvious modifications which adopt the principles of this unique animal house and system are deemed to be part of this invention, which is to be limited only by the scope of the appended claims and the reasonably equivalent structures to those defined therein.

I claim:

1. An animal house comprising: a foundation and superstructure; a slatted floor supported on said foundation; water pit means beneath said floor; said pit means being divided into a plurality of adjacent long, parallel, narrow pits having a length several times greater than the width, each having confining walls including a pair of elongated, parallel side walls and a pair of small end walls, and each normally filled with water to receive manure trampled through said floor; the bottom portions of each of said pits being slanted downwardly from end to end, all toward one end; a transverse receiving gutter common to said one ends of said pits and having an outlet out from beneath said house; a plurality of valve means, with normally closed drain control valve means between each of said water pits and said gutter to allow water level and drainage in each elongated pit to be independently controlled; and water inlet means at the ends of said pits opposite said common gutter to provide relatively uniform, maximum velocity flow conditions for water-manure slurry from said pits.

2. The animal house in claim 1 wherein flushing openings are provided between the opposite ends of said pits enabling drainage of one pit and flushing thereof by flow from the adjacent pit, with the last pit being flushed by water from said fresh water inlet means.

3. The animal house in claim 1 wherein said fresh water inlet means is in one of said pits at the end opposite the drain valve; and connecting flow means is provided between said pits at the opposite ends thereof from said drain valves, providing flushing flow to adjacent pits and also water equalizing flow when said pits are filled by said fresh water inlet means.

4. The animal house in claim 1 wherein a plurality of said pits extend from one side of said gutter while the remainder of said pits extend from the opposite side of said gutter, each of said pits being slanted downwardly from end to end toward said central gutter.

5. The animal house in claim 1 wherein there is provided water collecting gutter trough means along the roof of said superstructure and said trough means is connected to said water inlet means to provide a supplemental source of water for filling said pits.

6. The animal house in claim 1 wherein there is provided water collecting gutter trough means along the roof of said superstructure; said trough means being connected to said water inlet means to provide a supplemental source of water for filling said pits; and cooling water supply means on said roof for cooling said house and also serving as partial supply means for the inlet to said pits.

References Cited by the Examiner
UNITED STATES PATENTS

| | | | |
|---|---|---|---|
| 1,711,004 | 4/29 | Youngman | 119—28 X |
| 2,523,615 | 9/50 | Fell | 119—28 X |

FOREIGN PATENTS 859,081  12/52  Germany.

OTHER REFERENCES

"Farm Journal," page 44, June 1961.
"Illinois Research" vol. 3, No. 3, page 7, summer 1961.
"Iowa Farm Science" vol. 16, No. 9, pages 136 and 137, March 1962.

T. GRAHAM CRAVER, *Primary Examiner.*

ALDRICH F. MEDBERY, ARNOLD RUEGG,
*Examiners.*